Patented May 20, 1947

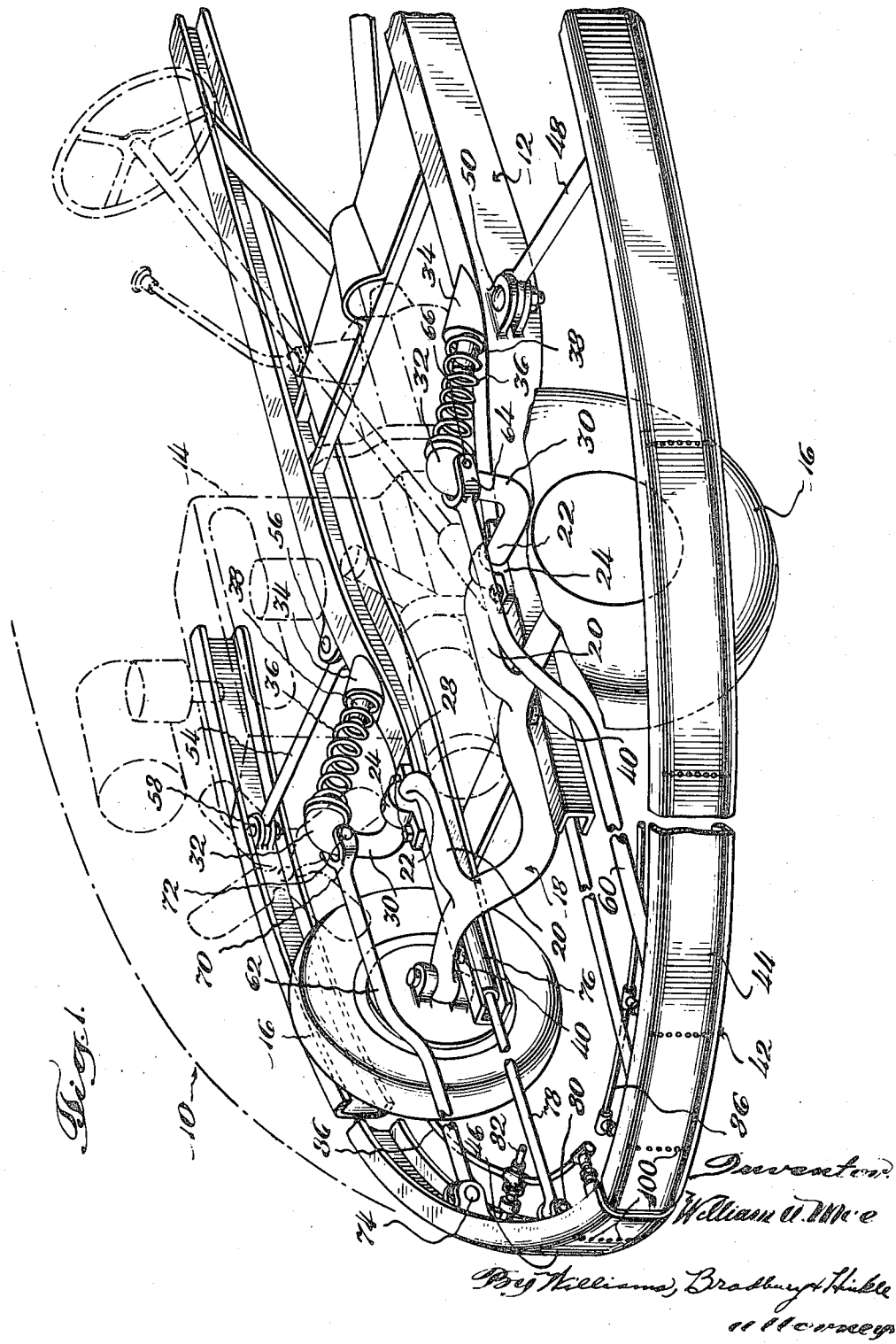

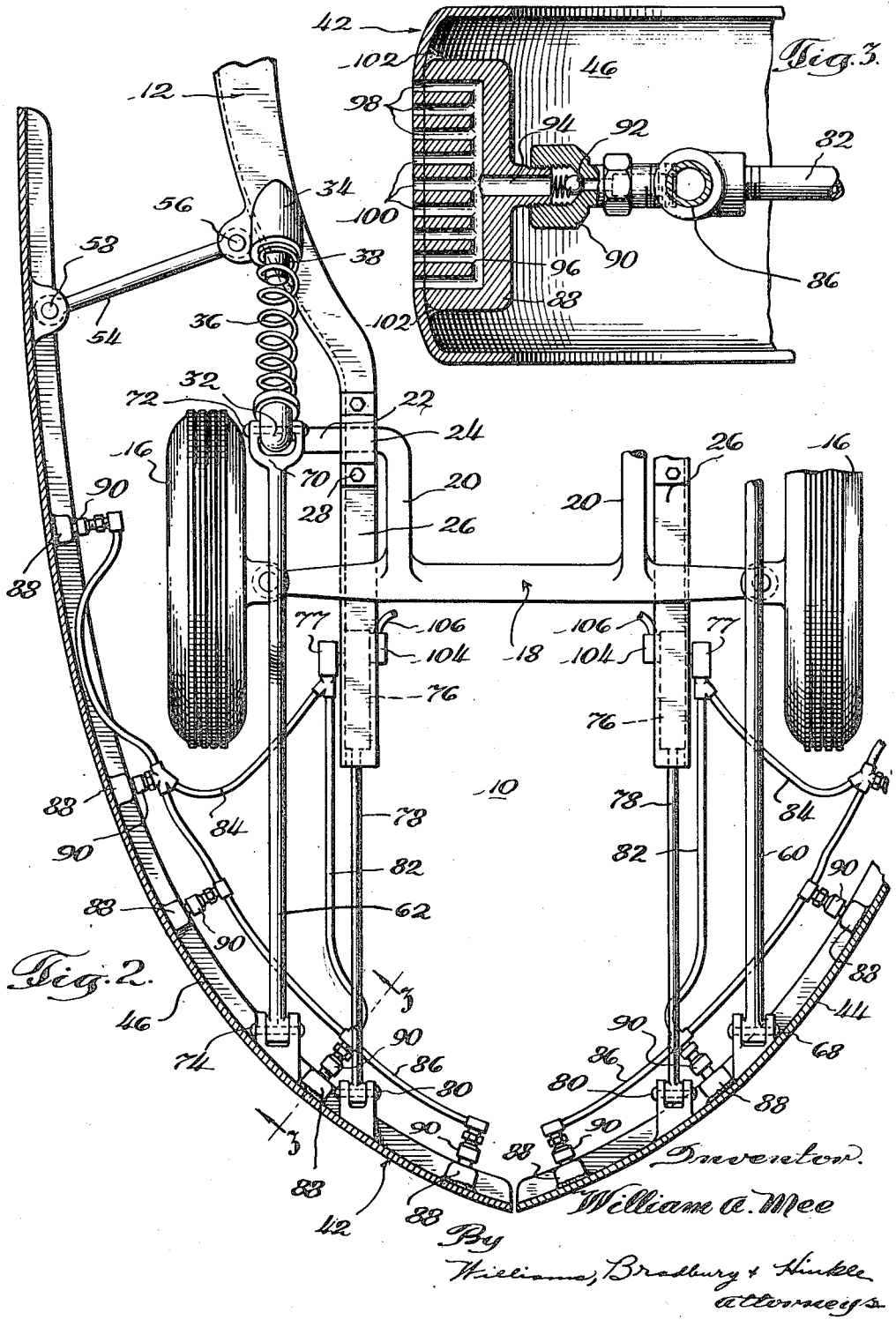

2,420,894

UNITED STATES PATENT OFFICE 2,420,894

COLLISION GUARD

William A. Mee, Springfield, Ohio

Application September 16, 1944, Serial No. 554,363

10 Claims. (Cl. 293—55)

My invention relates generally to the art of vehicle construction, and in particular to a novel bumper.

One of the chief causes of loss of life in automobile accidents is the head-on, or near head-on, collision. In such an accident involving contemporary automobiles, the bumper affords little protection to either the vehicle or its occupants if either vehicle is moving at a high speed. This is due to the fact that the collision is between two objects possessing very high momentums which are effective in opposite directions. The force of the momentums is dissipated in damaging the vehicles in an amount which is usually dependent upon the value of the momentums and the structural make-up of the vehicles.

The principal object of the present invention is the provision of a novel vehicle bumper which affords greater protection to the vehicle and which materially reduces the shock of collision and minimizes the property damage and personal injury.

Another object of the present invention is the provision of a novel vehicle bumper which utilizes the momentum of the vehicle in order to minimize property damage and personal injury.

Another object of the present invention is to provide a novel vehicle bumper which causes the vehicle to turn from its former direction of travel when it collides with another object.

Another object of the present invention is to provide a novel vehicle bumper which utilizes the momentum of the vehicle to remove the adjacent wheels from the ground so that the vehicle may be turned from its direction of travel when it collides with another vehicle or object.

Still another object of the present invention is to provide a novel vehicle bumper which will slide more readily across and past the surface of any object it may contact.

A further object of my invention is to provide a novel vehicle bumper which accomplishes the above utilitarian objectives and simultaneously lends itself to incorporation into a streamlined automobile design.

An additional object of the present invention is the provision of a novel bumper construction which may be incorporated into a conventional automobile with a minimum of rearrangement of the customary automobile equipment.

Other objects and advantages will become apparent from the following description taken in conjunction with the accompanying drawings, in which, Fig. 1 is a perspective view of the front portion of a vehicle chassis on which is mounted my improved bumper, the parts not incorporated in this invention being shown in phantom lines;

Fig. 2 is a plan view of the front portion of the vehicle chassis with the bumper illustrated in plan section;

Fig. 3 is a cross-sectional view taken on the line 3—3 of Fig. 2.

Referring to Fig. 1, the numeral 10 indicates generally an automobile having the customary frame 12, power plant 14, and front wheels 16. The front wheels 16 are mounted on an axle 18, and for purposes of simplicity and clarity of illustration the steering mechanism, king pins, and tie rod have been omitted.

The axle 18 is provided with a pair of rearwardly extending, substantially horizontally disposed arms 20 which are positioned a short distance in from the outer extremities of the axle and may be formed integrally therewith. The rearwardly extending arms are bent outwardly to provide bearing surfaces 22 which are parallel to the major axis of the axle. A pair of bearing mountings 24 which may be of the pillow-block type are mounted on forwardly extending channel members 26 forming the side members of the frame 12. The bearings 24 are secured to the frame by bolts 28, and the channel members 26 are sufficiently long so as to extend beneath the axle 18.

Connected to each of the bearing rods 22 is a vertically disposed arm 30 provided with an elbow-shaped head 32. Positioned to the rear of each bearing mounting 24 is a block or an abutment 34 which may be welded to the top side of the channel members 26. A relatively heavy spring 36 is held between each head 32 and the adjacent block 34, and the spring 36 is prevented from sidewise displacement by a guide pin 38 on the block 34 and by fitting into a recess (not shown) in the head 32. The springs 36, therefore, bias the axle 18 in a counterclockwise direction (Fig. 1) which is downwardly against the forwardly extending channel members 26. The springs may be sufficiently heavy to support the weight of the vehicle that is normally carried on the front wheels 16 without appreciably compressing, and they serve as a substitute for the customary leaf spring, coil spring, or other type shock absorber, or they may be only a partial support for the aforementioned weight, the remaining support being provided by the addition of the customary spring or shock absorber.

So that the axle 18 will not be rotated by the springs 36 in a counterclockwise direction (Fig. 1) beyond the normal position, the front ends of the side channels 26 extend beneath the axles between the rearwardly extending arms 20 and the outer extremities of the axle. The portions of the axle which overlie the channel member 26 rest on pads 40 which may be made of rubber, or, preferably, of an oil-resistant pliable synthetic composition. It will be appreciated that in normal position with the front wheels supporting their share of the load, the axle 18 will be held against the pads 40 on the frame 12 by the springs 36.

A bumper 42 is curved about the front end of the vehicle and is composed of two segments 44 and 46 having generally similar contours. The segments 44 and 46 extend in opposite directions away from the center of the vehicle and terminate a short distance behind the front wheels 16. Near the rear terminus of the segment 44 a bar 48 pivotally connected to the frame at 50 and to the bumper at 52 mounts the segment 44 on the frame 12. A similar bar 54 pivoted at 56 and 58 mounts the segment 46 on the frame 12. The bumper is thus permitted a lateral movement relative to the frame 12.

The bumper 42 is also operatively connected to the front axle by a pair of rods 60, 62. The rod 60 is provided with a yoke 64 which is pivotally connected at 66 to the head 32 at the left side of the axle (right side Figs. 1 and 4) and is pivotally connected at 68 to the bumper segment 44. The rod 62 is provided with a similar yoke 70 which is pivotally connected at 72 to the head 32 at the right side of the axle (left side Figs. 1, 2 and 4) and is pivotally connected at 74 to the bumper segment 46. As the bumper is lower than the heads 32 at the upper end of the extensions 30 of the axle, each of the rods 60, 62 may be offset between their extremities.

This device operates as follows to minimize the damage to a vehicle in a collision, and to materially remove the possibilities of personal injury:

Assume that the automobile equipped with the bumper of my invention is traveling in a forward direction and collides nearly head-on with another vehicle traveling in the opposite direction. For the purpose of convenience in this discussion, the vehicle equipped with the bumper of my invention will be designated as vehicle A, and the other vehicle will be designated as vehicle B. The front bumper 42, or one of its segments 44, 46 of vehicle A strikes vehicle B with sufficient force to drive the bumper of vehicle A rearwardly relative to the frame 12. The force of the impact is sufficient to cause the front axle 18 to be rotated in a clockwise direction (Fig. 1) about the bearing 24. Because of the inertia possessed by vehicle A, the frame 12 and other parts mounted thereon have a tendency to continue their travel in a straight line, but the action of the bumper 42 on the axle 18 has rotated it and removed the front wheels 16 from the ground. During the instant that the wheels 16 are removed from the ground, the bumper 42, due to its curved shape about the front of vehicle A, will deflect vehicle A to one side or the other of vehicle B. During this instant vehicle A still possesses momentum, but its direction has been changed and it will pivot on its rear wheels. Although front wheels 16 are removed from the ground for only a very short period of time, it is sufficient for the bumper to rotate the axle 18 against the force of the springs 36 and hold it in that changed position while the forward part of vehicle A is deflected. As soon as the momentum has been spent, the springs 36 will restore the axle to its normal position.

In the event of collision, the bumper will not necessarily be pushed back so far that the body of vehicle A will come into contact with the body of vehicle B, and it will then be preserved from severe damage. If the combined speeds of both vehicles is very great, then the impact force and inertia will be great and the wheels 16 will be held off the ground for a relatively longer period of time. In this instance there might be some damage to either or both vehicles, but not nearly so much as would be done if vehicle A were not equipped with my invention. Of course, if both vehicle A and vehicle B were equipped with my invention, it will be appreciated that they will be deflected away from each other, thereby further reducing the possibilities of damage and personal injury.

In order to insure that the bumper 42 will slide across the object with which it collides, I prefer to lubricate its exposed surface. So that the bumper will not be unsightly and gather road dirt, and so that it will not spread grease on the clothing of persons who might accidentally brush against it when the vehicle is standing still, I prefer to add the lubricant only at the time it is needed. As both of the bumper segments 44 and 46 are similarly equipped, only one lubricating device need be described.

The lubricant for immediate use may be stored in a compressor 76 of the movable piston type which may be mounted within the forwardly extending channel 26 of the frame 12. The piston rod of the compressor 76 is provided with an extension 78 which is pivotally connected at 80 to the segment 44 (or 46). The outlet 77 of the compressor is provided with a check valve (not shown) permitting lubricant flow in only one direction, and it is connected by flexible conduits 82, 84 to another conduit 86 which is secured behind the surface of the bumper segments 44, 46. The conduit 86 is adapted to supply the lubricant to a number of headers or fittings 88 through suitable connections 90, the number of which is proportionately greater near the forward part of the bumper. Each connection 90 is provided with a ball-type check valve 92 permitting lubricant flow in an outward direction and preventing grease from being sucked back through the conduits 86, 84, 82.

Each fitting or header 88 is provided with a single inlet passageway 94 which leads into a distributing passageway 96. A plurality of distributing passageways 98 connect the passageway 94 with a plurality of orifices 100 in the surface of the bumper segments 44 or 46. The header or fitting 88 may be permanently welded to the bumper segment 46 or 44 as indicated at 102 so that the distributing passageways 98 register with the orifices 100.

When the bumper 42 is pushed toward the frame 12 under the force of an impact with another object, the piston rod 78 will actuate the piston of the compressor 76 to force lubricant through the check valve at the outlet 77, conduits 82, 84, 86, check valve 92, passageways 94, 96, 98 and orifices 100 to the surface of the bumper. Since the conduits and passageways should normally be full of lubricant, lubricant will commence to flow from the orifices as soon as the piston is actuated under any influence exerted by the bumper 42. As the lubricant emerges from the orifices 100 it is spread on the surface of the bumpers by the movement of the bumper across the surface of the object collided with, thereby lubricating both surfaces and making it easier for the objects to move relative to each other. If desired separate manually operable lubricant dispensers can be used so the driver can control the flow of lubricant to the bumper.

To prevent the compressor 76 from becoming air-locked and to refurbish the supply of lubricant in the compressor, it is provided with an inlet 104 having a check valve which is connected by conduit 106 to a supply of lubricant. The check valve permits lubricant to flow into the compressor only. When the bumper 42 is returned to normal position under the influence of the springs 36, the piston rod will withdraw the piston from the advanced position and lubricant will be drawn into the compressor 76 through the conduit 106 and past the check valve 104.

While I have described a preferred embodiment of my invention, it will be apparent to those skilled in the art that numerous changes and modifications may be made therein without departing from the spirit and scope of my invention. Therefore, I desire to be limited only by the appended claims. What I claim and desire to secure as new by United States Letters Patent is:

1. In a vehicle having a frame and a motive power supplying engine, the combination of an axle mounted to the vehicle frame for rotation about an axis parallel to the axis of said axle, a vehicle bumper, means operatively connecting said bumper to said axle to cause the axle to rotate about said axis when said bumper is moved relative to the vehicle frame.

2. In a vehicle having a frame and a motive power supplying engine, the combination of an axle, means connected to said axle forming a pair of bearing surfaces having their common axis parallel to and positioned to the rear of the axis of said axle, bearing means pivotally mounting said bearing surfaces to the vehicle frame, a vehicle bumper, and means operatively connecting said bumper to said axle to cause it to rotate on said pivotally mounted bearing surfaces when said bumper is moved toward the vehicle frame.

3. In a vehicle having a frame and a motive power supplying engine, the combination of an axle, means connected to said axle forming a pair of bearing surfaces having their common axis parallel to and positioned to the rear of the axis of said axle, bearing means pivotally mounting said bearing surfaces to the vehicle frame, a vehicle bumper, means operatively connecting said bumper to said axle to cause it to rotate on said pivotally mounted bearing surfaces when said bumper is moved toward the vehicle frame, and resilient means positioned between said axle and the vehicle frame to resist the rotational movement.

4. In a vehicle having a frame and a motive supplying engine, the combination of a vehicle bumper mounted on said frame so as to be capable of movement relative thereto, lubricant dispensing means having a piston rod extending therefrom, a multiplicity of orifices in the surface of said bumper, conduit means connecting the outlet of said lubricant dispensing means to said multiplicity of orifices, and means operatively connecting the piston rod of said lubricant dispensing means to said bumper, whereby lubricant will be forced through said conduit means and out said orifices when said vehicle bumper is moved toward the vehicle frame.

5. In a vehicle having a frame, traction supplying wheels, and a motive power supplying engine, the combination of a front axle, means connected to said axle forming a pair of bearing surfaces having their common axis parallel to and positioned to the rear of said axle, bearing means pivotally mounting said bearing surfaces to the vehicle frame, a vehicle bumper, said bumper being formed of a pair of segments, each of said segments being of arcuate shape and extending from the front center of the vehicle to a point behind the front wheels, means mounting each of said bumper segments to the vehicle frame so that each segment may move relative thereto, and means operatively connecting each of said bumper segments to said axle whereby said axle is rotated on said bearing surfaces when one or both of said bumper segments are forced toward the vehicle frame under the impact of a collision so as to remove the front wheels from the ground and to permit the vehicle to be deflected by the arcuately-shaped bumper from its normal path.

6. In a vehicle having a frame, traction supplying wheels, and a motive power supplying engine, the combination of a front axle, means connected to said axle forming a pair of bearing surfaces having their common axis parallel to and positioned to the rear of the axis of said axle, bearing means pivotally mounting said bearing surfaces to the vehicle frame, a vehicle bumper, said bumper being formed of a pair of segments, each of said segments being of arcuate shape and extending from the front center of the vehicle to a point behind the front wheels, means mounting each of said segments to the vehicle frame so that each segment may move relative thereto, means operatively connecting each of said bumper segments to said axle, and resilient means positioned between said axle and the vehicle frame, whereby said axle is rotated on said bearing surfaces and against the force of said resilent means when one or both of said bumper segments is forced toward the vehicle frame under the impact of a collision so as to remove the front wheels from the ground and to permit the vehicle to be deflected by the arcuately-shaped bumper from its normal path.

7. In a vehicle having a vehicle frame, traction supplying wheels and a motive power supplying engine, the combination of a front axle, means connected to said axle forming a pair of bearing surfaces having their common axis parallel to and positioned to the rear of the axis of said axle, bearing means pivotally mounting said bearing surfaces to the vehicle frame, an arcuately-shaped vehicle bumper mounted to move relative to the vehicle frame, means operatively connecting said bumper to said axle, lubricant dispensing means including an actuating member, a multiplicity of orifices in the surface of said bumper, conduit means connecting the outlet of said lubricant dispensing means to said multiplicity of orifices, and means operatively connecting the actuating member of said lubricant dispensing means to said bumper, whereby when the bumper is forced toward the vehicle frame under the impact of a collision said axle will be rotated on said bearing surfaces removing the front wheels from the ground and lubricant will be forced through said conduit means and out said orifices so that the bumper will readily slide across the surface of the object collided with and the vehicle deflected from its former path.

8. In a vehicle having a frame and a motive power supplying engine, the combination of an axle, means connecting the axle with the frame for up and down movement relative to said frame, a vehicle bumper mounted on the frame for horizontal movement relative thereto, and means connecting said bumper to said axle and operative to cause the axle to move upwardly when the bumper is moved toward the frame.

9. In a vehicle having a frame and a motive power supplying engine, the combination of an axle, means connecting the axle with the frame for up and down movement relative to said frame including resilient means positioned between the axle and the frame to resist upward movement of said axle, a vehicle bumper and means connecting said bumper to said axle and operative to cause the axle to move upwardly when the bumper is moved toward the frame.

10. In a vehicle having a frame and a motive power supplying engine, road wheels and resilient means through which said wheels normally support the frame, a bumper, and crank means fulcrumed on the frame connected to said wheels and to said bumper for moving the wheels vertically when the bumper is moved horizontally with relation to the frame.

WILLIAM A. MEE.

REFERENCES CITED

The following references are of record in the file of this patent:

UNITED STATES PATENTS

| Number | Name | Date |
| --- | --- | --- |
| 1,416,468 | Hoffman | May 16, 1922 |
| 1,800,142 | Heagney | Apr. 7, 1931 |